Nov. 4, 1969  R. W. JOHNSON  3,476,676
ELECTRICAL STOCK REMOVAL CUTTING TOOL ELECTRODE
Original Filed Dec. 11, 1963
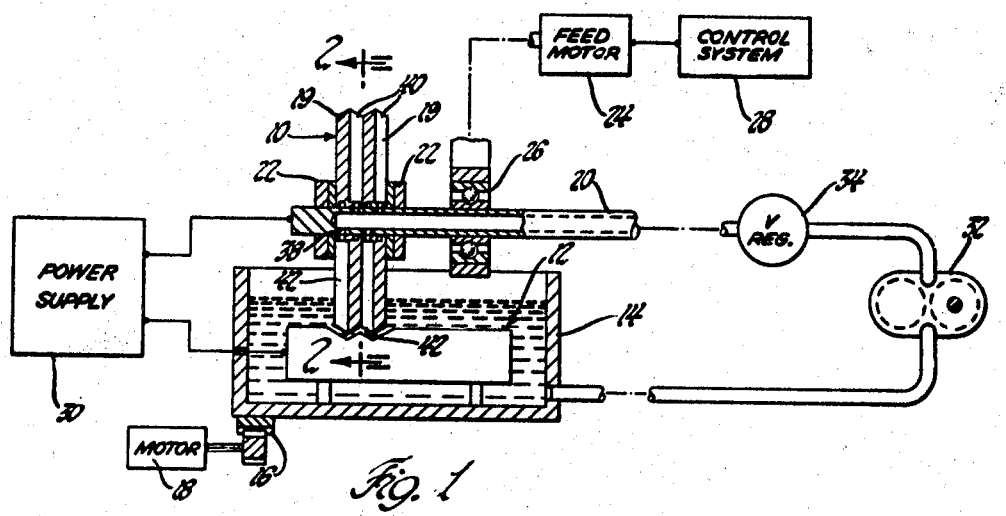
Fig. 1
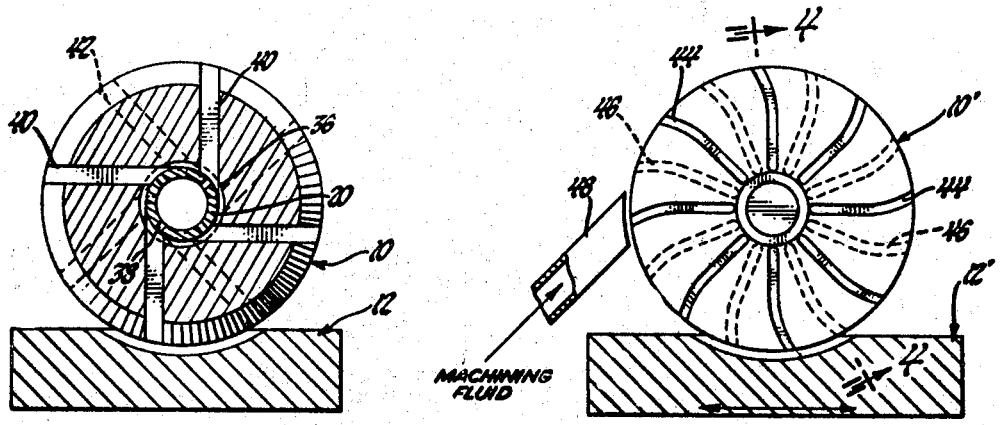
Fig. 2
Fig. 3
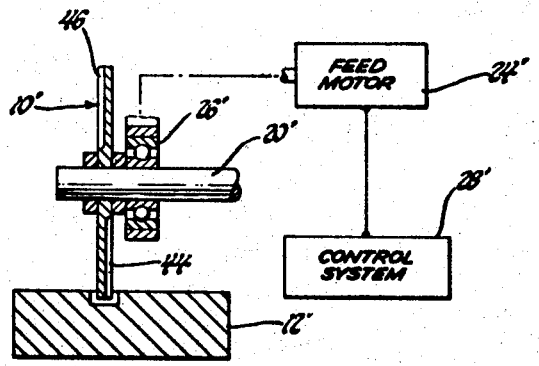
Fig. 4
INVENTOR.
Roger W. Johnson
BY
Hugh L. Fisher
ATTORNEY United States Patent Office 3,476,676
Patented Nov. 4, 1969

3,476,676
ELECTRICAL STOCK REMOVAL CUTTING TOOL ELECTRODE
Roger W. Johnson, Rochester, Mich., assignor to General Motors Corporation, Detroit, Mich., a corporation of Delaware
Original application Dec. 11, 1963, Ser. No. 329,699, now Patent No. 3,338,808, dated Aug. 29, 1967. Divided and this application Mar. 17, 1967, Ser. No. 623,918
Int. Cl. C23b 5/74
U.S. Cl. 204—284     4 Claims

ABSTRACT OF THE DISCLOSURE

A cutting tool electrode that is constructed as a wheel with fluid passages arranged along the opposite sides thereof. Fluid under pressure is supplied to the passages and the alignment of the passages deflects the fluid flow so that rotational forces are imposed upon the electrode. The passages are also constructed and arranged to deliver fluid to a machining area defined by the periphery and sides of the electrode so that with power supplied to a gap maintained between the electrode and a conductive workpiece, stock is electrically removed from the workpiece.

---

This application is a division of Ser. No. 329,699, filed Dec. 11, 1963, now U.S. 3,338,808, and entitled "Method and Apparatus for Electrical Stock Removal."

The invention relates to cutting tool electrode structures for use with electrical stock removal apparatus.

The electrical stock removal processes, such as electrical discharge machining and electrochemical machining, have been found useful in both grinding and slicing operations, particularly when the workpiece materials are extremely hard. Either or both of these grinding and slicing operations present special problems because they usually involve a rotating disk-type cutting tool electrode. Since the wheel-type electrode must be rotated, there is the added problem of drive connecting it to a drive motor while at the same time electrically connecting the cutting tool and workpiece electrodes to an electrical power supply. Related to the rotation of the cutting tool electrode is the problem of distributing the machining fluid, whether it is an electrolyte or a dielectric fluid. The machining area must have this fluid at all times for the machining process to continue efficiently.

With the foregoing in mind, a novel cutting tool electrode is proposed that is self driven and that efficiently distributes a machining fluid within the machining areas.

Also proposed is a unique electrode structure with machining fluid passages so arranged that the machining fluid flowing through these passages induces rotational movement of the wheel. This rotational movement facilitates the distribution of machining fluid to the machining areas.

The foregoing and other objects and advantages of the invention will be apparent from the following description and from the accompanying drawings, in which:

FIGURE 1 is a schematic diagram of apparatus incorporating the principles of the invention;

FIGURE 2 is a sectional view of the FIGURE 1 cutting tool electrode, taken along line 2—2 of FIGURE 1;

FIGURE 3 is a view of a modified cutting tool electrode; and

FIGURE 4 is a sectional view of the FIGURE 3 cutting tool electrode, taken along line 4—4 of FIGURE 3, and also shows schematically a control system for maintaining gap spacing.

Referring now to the drawings in detail and initially to FIGURE 1, the numerals 10 and 12 denote a pair of electrodes, which will hereinafter be referred to respectively as the cutting tool and the workpiece. The workpiece 12 is fixedly mounted within and insulated from a tank 14 containing a machining fluid. This tank 14 may be moved fore and aft by the agency of a rack and pinion, shown generally at 16, and a motor 18. The cutting tool 10 is wheel-like and may comprise a series of identical sections 19, all supported in any suitable way on a hollow and rotatable shaft 20. If preferred, the shaft 20 can be maintained stationary and the tool 10 rotated thereon. The axial position of the cutting tool 10 is established by retaining spacers 22. The spacing of the cutting tool 10 relative to the workpiece 12 is the function of a feed motor 24. The feed motor 24 has a bearing connection at 26 with the shaft 20 such that the cutting tool 10 can be moved in a gap closing or a gap reducing direction, as determined by a suitable control system 28 for the feed motor 24. Material is removed from the surface of the workpiece 12 as soon as the proper gap spacing is established and electrical power is supplied to the gap by a power supply 30 connected as illustrated in FIGURE 1. Of course, the shaft 20 must be electrically isolated in any appropriate way.

If the material is to be removed from the workpiece 12 by the electrochemical machining process, the machining fluid will be an electrolyte and the power supply will be of a type that supplies a direct current to the gap. This direct current will flow through the electrolyte and by the resultant continuous discharge cause the material to be electrochemically removed from the surface of the workpiece 12 with a configuration conforming to that of the periphery of the cutting tool 10. Reference is made to United States Patent No. 3,228,863, issued Jan. 11, 1966, to Glenn E. Wanttaja et al., and entitled "Electrolytic Process and Apparatus for Removing Stock From a Conductive Workpiece," for a disclosure relative to the motor 24 and the control system 28 and how to adapt for use with the electrochemical process. On the other hand, if the electrical discharge machining process is to be employed, the machining fluid will be some suitable dielectric and the power supply 30 will supply a pulsating current to the gap. Consequently, intermittent discharges will occur across the gap and cause the material to be eroded from the workpiece 12. In carrying out the electrical discharge machining process, the feed motor 24 and the control system 28 may be of the character described in the patent to Colten et al. 3,059,150.

The machining fluid is supplied to the shaft 20 by a suitable pump 32 whose inlet communicates with the tank 14 and whose outlet is connected to the shaft 20 at a point upstream from the pump 32. The outlet of the pump 32 also includes a conventional pressure regulator 34 that adjustably establishes whatever pressure is wanted for the system.

The FIGURE 1 cutting tool 10, as shown in FIGURE 2, has annular grooves 36 in sections 19 aligned with openings 38 in the shaft 20. The cutting tool 10 has outwardly extending and what will be termed as radially offset from the axis thereof a series of passages or grooves 40 and 42 equally spaced and alternately arranged in the opposite faces of the cutting tool 10. For explanatory purposes, the grooves on the right side, as viewed in FIGURE 1, have been assigned the numerals 40 and the grooves on the left side the numerals 42. This equal spacing and additional interspacing, i.e., between two equal spaced grooves 40 in one face there is a groove 42 in the opposite face, promotes more stable rotational operation of the cutting tool 10.

In operation, the machining fluid is delivered by the pump 32 through the center of the shaft 20 passes through the openings 38 and the annular grooves 36 and into the grooves 40 and 42. The fluid then proceeds outwardly and to the gap area. In traversing this path the machining fluid will develop rotational forces, which will be applied to the cutting tool 10 and cause it to revolve. These rotational forces will be determined by the radial offset, which in this embodiment is the radius of the shaft 20, the unit pressure of the incoming machining fluid and the cross-sectional area of the grooves 40 and 42. The rotational speed of the cutting tool 10 can easily be regulated by adjusting the pressure regulator 34 in any conventional way, or if preferred the pressure regulator 34 can be eliminated and the speed of the pump 32 controlled.

With the grooves 40 and 42 open and arranged as illustrated, the efficient distribution of the machining fluid to the work area is assured by the rotation of the cutting tool 10. This affords a further benefit because it eliminates the need for special structures to properly distribute the fluid.

In the FIGURE 3 apparatus the modified cutting wheel 10' is provided with passages or grooves 44 in one face equally, angularly spaced that extend radially and arcuately outwardly from the rotational axis of the cutting tool 10'. Similar passages or grooves 46 in the other face are provided except that the grooves 46 are spaced in between the grooves 44, as viewed in FIGURE 3.

In this FIGURE 3, arrangement, machining fluid is delivered to the periphery of the cutting tool 10 by a discharge tube 48. The discharge tube 48 may communicate with the outlet of a pump, such as the pump 32 in FIGURE 1. This machining fluid, in exiting from the discharge tube 48, will flow in the grooves 44 and 46 and, as with the FIGURE 1 apparatus, induce rotational forces that will cause the cutting tool 10' to rotate clockwise, as viewed in FIGURE 3. This fluid will, of course, be distributed along the sides or faces of the cutting tool 10' and also to the periphery so as to at all times be present within the machining area defined by the adjacent surfaces of the cutting tool 10 and the workpiece 12'.

Feeding of the cutting tool 10' relative to the workpiece 12' can be accomplished in the same way as that in FIGURE 1; namely, as shown in FIGURE 4, by a feed motor 24' having a bearing connection at 26' with a shaft 20 that supports the cutting tool 10'. A control system 28' can be used to control the feed motor 24 and provide the desired gap spacing.

From the foregoing it will be appreciated that a very efficient way of either grinding the surface of a workpiece or slicing through a workpiece is provided, utilizing a unique wheel-like cutting tool that is self-propelled in such a way that the machining fluid is effectively delivered to the machining area at all times. This reduces the complexity of this type of apparatus as well as renders the apparatus quite inexpensive and without the need for a separate motor to rotate the cutting tool.

The invention is to be limited only by the following claims.

What is claimed is:

1. An electrode for electrically removing stock from a workpiece comprising an annular body having opposite faces each provided with circumferentially spaced and radially inwardly extending passages, the passages in one face being situated between the passages in the other face, the passages in both faces being so arranged that machining fluid entering the passages is deflected so as to cause rotation inducing forces to be applied to the body.

2. An electrode for electrically removing stock from a workpiece comprising a wheel of conductive material having a series of circumferentially and equispaced passages alternately provided in the opposite faces of the wheel and extending inwardly from the periphery thereof to the hub thereof, the passages being radially offset so that machining fluid in entering the passages at the hub will be deflected so as to induce rotational forces that cause the wheel to rotate.

3. An electrode for electrically removing stock from a workpiece comprising a plurality of wheel sections of conductive material each wheel section having therein a series of circumferentially equispaced, inwardly extending to the hub thereof and radially offset grooves alternately provided in the opposing faces thereof so as to cause machining fluid flowing from the hub through the grooves to be deflected and thereby generate rotation inducing forces for causing the electrode to rotate and also for delivering the machining fluid to the machining area between the electrode and the workpiece.

4. An electrode for electrically removing stock from a workpiece comprising a wheel of conductive material and having a series of circumferentially spaced grooves alternately provided in the opposing faces of the wheel, the grooves having an arcuate configuration and extending inwardly from the periphery of the wheel so that machining fluid flowing through the grooves is deflected to thereby generate rotation inducing forces for causing the wheel to rotate and also causes machining fluid to be delivered to the machining areas between the electrode and the workpiece.

References Cited

UNITED STATES PATENTS

| 2,798,846 | 7/1957 | Comstock | 204—284 XR |
| 2,840,960 | 7/1958 | Booth | 204—224 XR |
| 3,401,102 | 9/1968 | Stiff | 204—224 XR |

FOREIGN PATENTS 493,108  9/1930  Great Britain.

JOHN H. MACK, Primary Examiner

D. R. VALENTINE, Assistant Examiner

U.S. Cl. X.R.

204—215, 224